US012774932B2

(12) United States Patent
Molenaar

(10) Patent No.: US 12,774,932 B2
(45) Date of Patent: Oct. 27, 2026

(54) ON-LINE VALVE HEALTH MONITOR

(71) Applicant: Woodward, Inc., Fort Collins, CO (US)

(72) Inventor: Gregory A. Molenaar, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 1079 days.

(21) Appl. No.: 17/813,196

(22) Filed: Jul. 18, 2022

(65) Prior Publication Data

US 2024/0019333 A1 Jan. 18, 2024

(51) Int. Cl.

*G01L 23/02* (2006.01)
*G01L 5/00* (2006.01)
*G01P 15/16* (2013.01)
*G08B 21/18* (2006.01)

(52) U.S. Cl.

CPC ............ *G01L 23/02* (2013.01); *G01L 5/0061* (2013.01); *G01P 15/16* (2013.01); *G08B 21/18* (2013.01)

(58) Field of Classification Search

CPC ........ G01L 23/02; G01L 5/0061; G01P 15/16; G08B 21/18; G05B 2219/34391; G05B 23/0221

See application file for complete search history.

(56) References Cited

U.S. PATENT DOCUMENTS 6,330,525 B1 12/2001 Hays et al.
7,328,098 B1 2/2008 VanderLeest et al.
8,838,359 B2 9/2014 Qiu et al.
10,060,358 B2 8/2018 Tiwari et al.
10,151,236 B2 * 12/2018 Zhang ................ F02D 41/0085

(Continued)

FOREIGN PATENT DOCUMENTS

CN 103953399 10/2016
CN 113125161 7/2021

(Continued)

OTHER PUBLICATIONS

International Preliminary Report on Patentability in International Application No. PCT/US2023/028009, mailed on Jan. 30, 2025, 8 pages.

(Continued)

*Primary Examiner* — Aditya S Bhat
(74) *Attorney, Agent, or Firm* — Fish & Richardson P.C.

(57) ABSTRACT

The subject matter of this specification can be embodied in, among other things, a method for determining health of an actuator that includes applying power to an actuator operating in a nominal operational state, capturing a first signal representative of actuator movement or actuator position, capturing a second signal representative of total actuator force, determining, based on the first signal, an inertial force value representative of force used to overcome at least one of inertia of the actuator and inertia of a load on the actuator, determining, based on the inertial force value and the captured second signal, a load force value representative of actuator force used to overcome force of the load and friction of the load, determining a health value of the actuator based on the load force value, and providing an indication of health of at least one of the actuator and the load.

25 Claims, 8 Drawing Sheets

(56) References Cited

U.S. PATENT DOCUMENTS

| | | | | |
|---|---|---|---|---|
| 10,871,081 | B2 | 12/2020 | Reigl | |
| 2014/0309846 | A1 | 10/2014 | Howard | |
| 2020/0131927 | A1 | 4/2020 | Tolmatsky et al. | |
| 2023/0059686 | A1 * | 2/2023 | Poloni | G05B 23/0275 |
| 2024/0424686 | A1 * | 12/2024 | Giftthaler | B25J 13/088 |

FOREIGN PATENT DOCUMENTS

| | | |
|---|---|---|
| EP | 0947901 | 10/1999 |
| EP | 3258331 | 12/2017 |

OTHER PUBLICATIONS

International Search Report and Written Opinion in International Application No. PCT/US2023/028009, mailed on Nov. 7, 2023, 13 pages.

* cited by examiner

ON-LINE VALVE HEALTH MONITOR

TECHNICAL FIELD

This instant specification relates to industrial turbine control systems, more particularly the monitoring of the operational health of actuators used to control industrial turbine systems.

BACKGROUND

A turbine is a rotary mechanical device that converts energy from a fluid flow to work, such as by providing thrust or rotary mechanical power. A turbine is a turbomachine with at least one moving part called a rotor assembly, which is a shaft or drum onto which blades attached. Moving fluid acts on the blades so that they move and impart rotational energy to the rotor.

Actuators, controlled by a control system, are used to controllably vary inputs and outputs of turbine systems (e.g., fuel, steam). Malfunctioning actuators can cause operational problems such as incorrect turbine output or cause damage to the turbine and/or associated systems. One example failure mode is an increase in valve friction, such as that due to wear or contaminant build-up, which can cause poor dynamic response or can even stall the actuator.

Some existing solutions for testing the health of turbine actuators operate by causing the actuators to cycle through their operational ranges of motion. Such cycling, however, generally requires the turbine system to be taken offline, which is not a practical option in many operational situations. Off-line testing can be labor intensive, and the sampling intervals can be so long that failing valves can easily be missed. True trends are also hard to identify with such sparse data. Furthermore, off-line testing can falsely flag a valve due to contamination build-up in a region beyond where the valve normally operates (e.g., valves are usually oversized, sometimes severely, so the full stroke is not used).

SUMMARY

In general, this document describes systems and techniques for monitoring of the operational health of actuators, more specifically, actuators used to control industrial turbine systems.

In a general example implementation, a computer-implemented method for determining health of an actuator includes applying power to an actuator operating in a nominal operational state, capturing a first signal representative of actuator movement or actuator position, capturing a second signal representative of total actuator force, determining, based on the first signal, an inertial force value representative of force used to overcome at least one of inertia of the actuator and inertia of a load on the actuator, determining, based on the inertial force value and the captured second signal, a load force value representative of actuator force used to overcome force of the load and friction of the load, determining a health value of the actuator based on the load force value, and providing an indicator based on the health value as an indication of health of at least one of the actuator and the load.

Various implementations can include some, all, or none of the following features. The method can include determining, based on the captured first signal, low acceleration of the actuator. Determining the load force value can include determining, based on the captured second signal, a total force value, determining, based on the inertial force value, an inertial force of at least one of the actuator and of the load, determining a difference between the total force value and the inertial force value, and providing the determined difference as the load force value. The inertial force value can be a predetermined inertial force value of at least one of the actuator and the load. The inertial force value can be based on (1) a predetermined mass of at least one of the actuator and the load, and (2) an acceleration value of the actuator based on the captured first signal. The acceleration value can be determined based on a differential based on the captured first signal. The acceleration value can be determined based on a measurement of actuator acceleration. The acceleration value can be determined based on a model or state observer of the actuator. Power applied to the actuator can be electrical power, and the second signal can be representative of at least one of applied voltage or applied current, or power applied to the actuator can be fluid power, and the second signal can be representative of applied fluid pressure. The health value can be determined by filtering the captured second signal. The health value can be determined based on a comparison of a predetermined threshold value to at least one of the filtered second signal and a determined long-term force trend. The method can include determining, based on the captured first signal, a direction of movement of the actuator, wherein the health value is further based on the determined direction. The method can include providing, to a user, an indication representative of the health value.

In a general example embodiment, a system for determining health of an actuator under a load includes a first sensor configured to provide a first signal representative of position or movement of an actuator, a second sensor configured to provide a second signal representative of total force provided by the actuator, a processing system configured to apply power to an actuator operating in a nominal operational state, receive the first signal, receive the second signal, determine, based on the first signal, an inertial force value representative of force used to overcome at least one of inertia of the actuator and inertia of a load on the actuator, determine, based on the inertial force value and the received second signal, a load force value representative of actuator force used to overcome force of the load and friction of the load, and determine a health value of the actuator based on the load force value, and an indicator configured to provide an indication of health of at least one of the actuator and the load based on the health value.

Various embodiments can include some, all, or none of the following features. Determining the load force value can include determining, based on the received second signal, a total force value, determining, based on the inertial force value, an inertial force of at least one of the actuator and of the load, determining a difference between the total force value and the inertial force value, and providing the determined difference as the load force value. The inertial force value can be based on (1) a predetermined mass of at least one of the actuator and the load, and (2) an acceleration value of the actuator based on the received first signal. The acceleration value can be determined based on a differential based on the received first signal. The acceleration value can be determined based on a measurement of actuator acceleration. The acceleration value can be determined based on a model or state observer of the actuator.

In another general example embodiment, a turbine control system includes a turbine, an actuator configured to control a flow to the turbine based on a control signal, a first sensor configured to provide a first signal representative of position or movement of the actuator, a second sensor configured to provide a second signal representative of total force provided by the actuator, a turbine controller configured to apply power to an actuator operating in a nominal operational state, receive the first signal, receive the second signal, determine, based on the received first signal, an inertial force value representative of force used to overcome at least one of inertia of the actuator and inertia of a load on the actuator, determine, based on the inertial force value and the received second signal, a load force value representative of actuator force used to overcome force of the load and friction of the load, and determine a health value of the actuator based on the load force value, and an indicator configured to provide an indication of health of at least one of the actuator and the load based on the health value.

Various embodiments can include some, all, or none of the following features. Determining the load force value can include determining, based on the received second signal, a total force value, determining, based on the inertial force value, an inertial force of at least one of the actuator and of the load, determining a difference between the total force value and the inertial force value, and providing the determined difference as the load force value. The inertial force value can be based on (1) a predetermined mass of at least one of the actuator and the load, and (2) an acceleration value of the actuator based on the received first signal. The acceleration value can be determined based on a differential based on the received first signal. The acceleration value can be determined based on a measurement of actuator acceleration. The acceleration value can be determined based on a model or state observer of the actuator.

The systems and techniques described here may provide one or more of the following advantages. First, a system can provide an indication of actuator health status. Second, the system can determine the actuator health status during normal operations of the actuator. Third, the system can differentiate between internal loadings caused by the actuator and external loadings cause by a load being driven by the actuator. Fourth, the system can differentiate between loadings caused by aiding and resisting loads (e.g., opening and closing operations).

The details of one or more implementations are set forth in the accompanying drawings and the description below. Other features and advantages will be apparent from the description and drawings, and from the claims.

DETAILED DESCRIPTION

This document describes systems and techniques for monitoring of the operational health of actuators, more specifically, actuators used to control industrial turbine systems. In general, customers want and increasingly expect prognostics, e.g., advance notice when a metering valve or actuator is failing. Examples of such prognostics are sometimes referred to as "Digital Twin". On-line identification of load is difficult because the motion profile is highly variable and can contain significant accelerations. During steps, transient current will spike well above the steady state current limit even on a healthy valve, yet the current used to hold a steady state position is often well inside the friction band.

In general, the prognostic techniques described herein can operate run-time (e.g., during normal turbine operation) with little or no effect on valve performance and can differentiate between the power (e.g., electrical power, voltage, and/or current, or fluid power, pressure, and/or flow) required to overcome a load and the power required for acceleration of the actuator, then use predetermined power limits and trended load currents to predict when the valve should be replaced. By performing such observation of the actuator during nominal actuator and valve operations, nominal turbine operation can be maintained without the need to take the turbine offline for testing.

Figure 1:
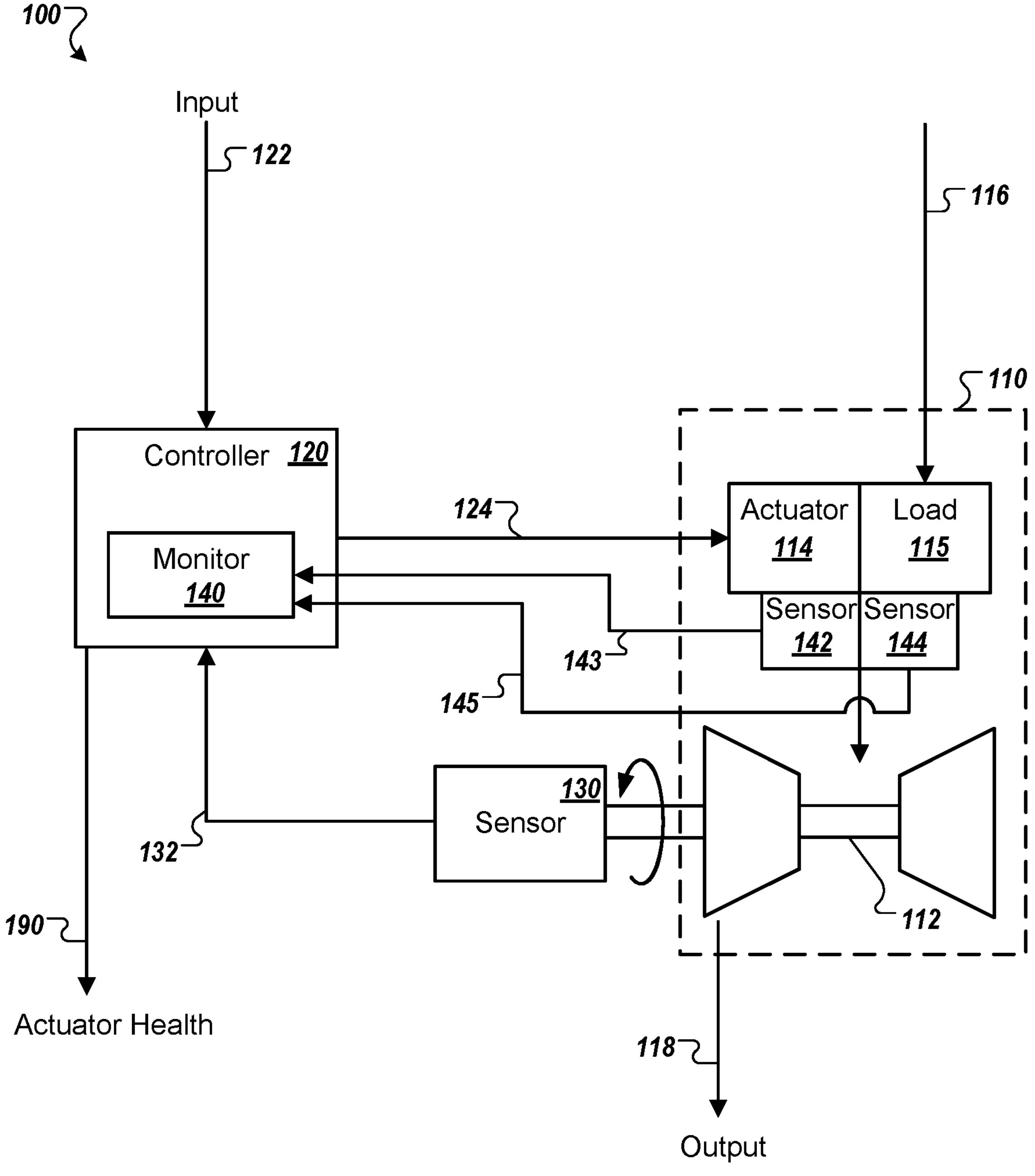
FIG. 1 is a schematic diagram that shows an example of an industrial turbine control system.

FIG. 1 is a schematic diagram that shows an example of an industrial turbine control system 100. A turbine assembly 110 includes a turbine 112, and a controllable load 115 (e.g., an actuator-driven valve) that is driven by a controllable actuator 114 configured to control the flow of one or more fluid or steam supplies 116 to the turbine 112. By controllably adjusting the controllable load 115 to control the flow of the steam/fluid supplies 116 to the turbine 112, the rotational speed, load, acceleration, deceleration, and other performance parameters of the turbine 112 can be controllably adjusted.

In some embodiments, the turbine 112 can be a gas turbine or other form of combustion-driven turbine. In such embodiments, the controllable load 115 can be a pump, valve, injector, and combinations of these and other devices for controlling the flows of the fluid supplies 116 such as gasses (e.g., natural gas, hydrogen, oxygen, propane, methane, air) and/or liquids (e.g., fuel, water) to the turbine 112. In some embodiments, the turbine 112 can be a steam turbine. In such embodiments, the controllable load 115 can include pumps, valves, injectors, and combinations of these and other devices for controlling the flow of the fluid supply 116, in the form of steam, to the turbine 112.

In the example system shown in FIG. 1, the controllable load 115 is actuated by the controllable actuator 114, and the controllable actuator 114 is adjusted based on a control signal 124 provided by a controller 120 (e.g., a turbine controller). In some embodiments, the controller 120 can include a proportional-integral-derivative (PID) controller. The controller 120 provides the control signal 124 to adjust the controllable actuator 114 based on an input parameter 122 (e.g., desired turbine speed), a feedback signal 132 provided by a sensor 130 configured to sense an output 118 of the turbine 112, and a collection of control parameters in a closed-loop feedback control system. In some embodiments, the sensor 130 can be a speed sensor configured to sense the rotational speed of the turbine 112, and provide a speed signal as the feedback signal 132 to the controller 120. In some embodiments, the sensor 130 can be a temperature, pressure, vibration, or any other appropriate sensor that can be used to sense a parameter of the turbine assembly 110 and provide the feedback signal 132 in response to the sensed parameter. In some embodiments, the controller 120 can be a P controller or a PI controller instead, or the controller 120 can be configured as a PI or P controller (e.g., by setting D and/or I gains to zero).

In the example system shown in FIG. 1, the controller 120 includes an actuator monitoring system 140. The actuator monitoring system 140 is configured to monitor the operational health of the controllable actuator 114 and/or the controllable load 115 based on the control signal 124, a feedback signal 143, and/or a feedback signal 145, and provide a health output signal 190 representative of a health value of the controllable actuator 114. The position and/or movement (e.g., configuration) of the one or both of the controllable load 115 and/or the controllable actuator 114 are sensed by a sensor 142. For example, the sensor 142 can be configured to sense a position of an output of the controllable actuator 114. In another example, the load 115 can be a valve, and the sensor 142 can be configured to sense a position of the valve. The sensor 142 provides the sensed configuration as the feedback signal 143 to the actuator monitoring system 140.

The force provided by the actuator 114 and/or the controllable load 115 are sensed by a sensor 144. The feedback signal 145 is representative of the sensed actuator force. The sensor 144 provides the sensed force as the feedback signal 145 to the actuator monitoring system 140.

In general, the actuator monitoring system 140 is configured to differentiate between power (e.g., applied current, applied voltage, applied fluid pressure) required to overcome load (e.g., inertial force) and power required for actuator acceleration, then use predetermined thresholds and the trended load measurements to provide information that can be used to estimate or predict when the controllable load 115 should be replaced. The actuator monitoring system 140 is configured to identify an acceleration value representative of acceleration current by one of two methods, and then subtract it from total current to calculate load current. In some embodiments, additional logic can be used to determine when to enable learning of upward or downward load current (e.g., opening and closing of valve) and differentiate between the different operational behaviors that can occur in the two different directional operations. In some embodiments, the actuator monitoring system 140 can learn loading and friction levels over a broad range of dynamic operating conditions, rather than only when the actuator is moving very slowly with minimal speed changes.

The health output signal 190 is a signal representative of the health state or health value of the controllable actuator 114. In some implementations, the health output signal 190 can be an indicator or alarm that can be perceived by a human operator to indicate the health of the actuator 114. For example, the health output signal 190 can take forms such as an indicator light, an audible alarm, a display on a graphical user interface, a gauge or meter, an alphanumeric display, or any other appropriate indication representative of actuator health. In some implementations, the health output signal 190 can be an analog or digital electrical signal that is detectable or receivable by another device as a communication of the health of the actuator 114. For example, the health output signal 190 can be a binary signal, a pulse width modulated signal, a digitally encoded (e.g., Ethernet) signal, or any other appropriate wired or wireless signal that can represent actuator health.

Figure 2:
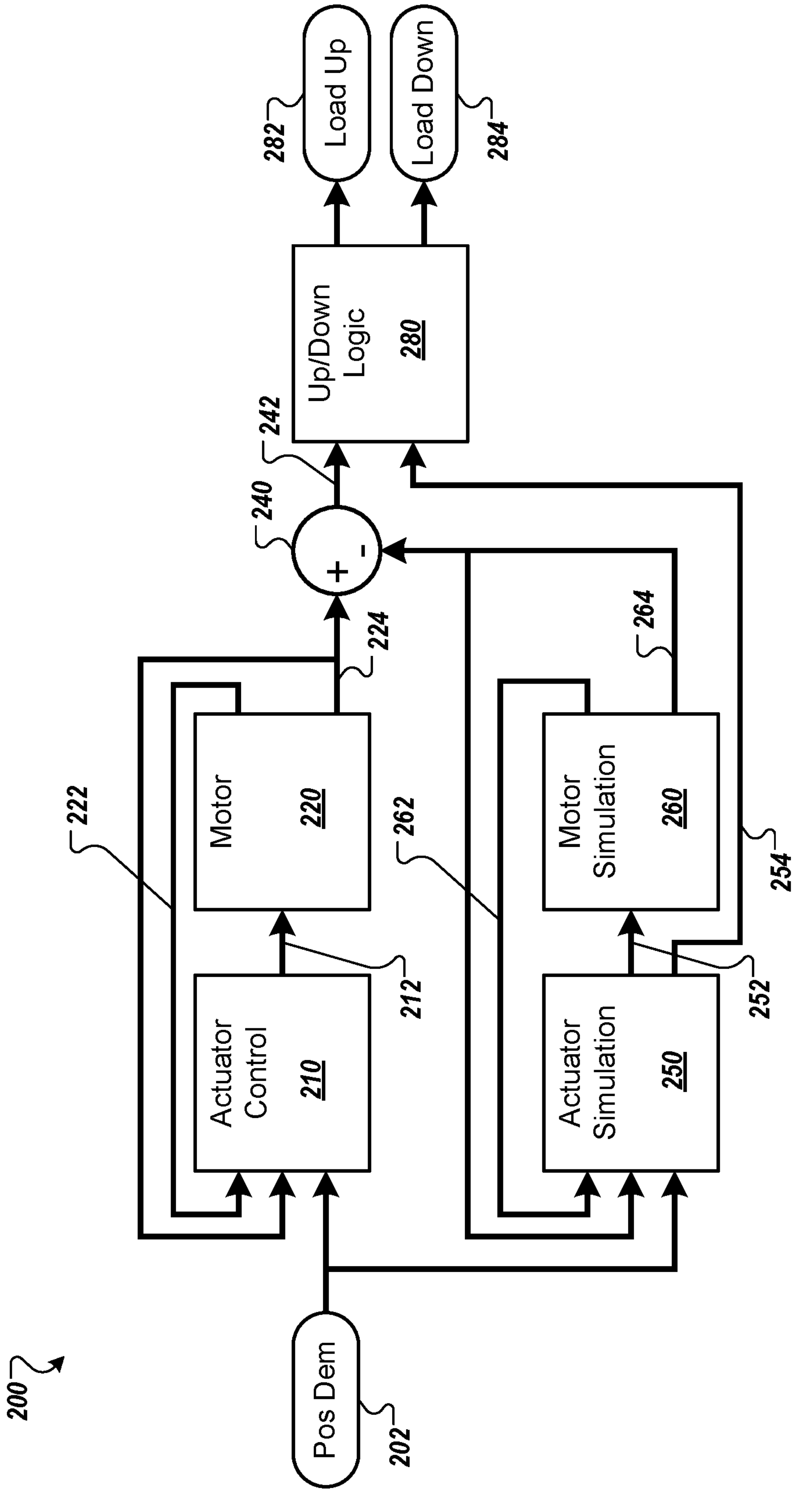
FIG. 2 is a block diagram of an example actuator monitoring system.

FIG. 2 is a block diagram of an example actuator monitoring system 200. In some embodiments, the actuator monitoring system 200 can be the example actuator monitoring system 140 of FIG. 1.

The example actuator monitor system 200 receives a position demand signal 202 as an input and provides it to an actuator control module 210 and to an actuator simulation module 250. The actuator control module 210 provides a control output signal 212 to drive a motor 220. The motor 220 provides a position feedback signal 222 (e.g., representative of actuator position) and a current feedback signal 224 as feedback to the actuator control module 210 (e.g., for use in a closed-loop control circuit). The current feedback signal 224 is also provided as positive feedback to a summing node 240.

The actuator simulation module 250 is configured to simulate the actuator control module 250 and provide a simulated control output signal 252 to drive a simulated motor 260 that is configured to simulate the motor 220. The simulated motor 260 provides a simulated position feedback signal 262 and a simulated current feedback signal 264 as feedback to the actuator simulation module 250 configured to simulate the control loop used in the actuator control module 210. The simulated current feedback signal 264 is also provided as negative feedback to the summing node 240.

At the summing node 240, the simulated current feedback signal 264 is subtracted from the current feedback signal 224 to determine a current difference signal 242. The current difference signal 242 is provided to a directional (e.g., up/down) logic module 280. The directional logic module 280 also receives the simulated velocity signal 254 provided by the actuator simulation module 250.

The actuator simulation module 250 is also configured to provide a simulated velocity signal 245. The simulated velocity signal 254 is representative of the velocity and direction that the simulated motor 260 is being commanded to provide (e.g., an idealized representation of the velocity and direction that the motor 220 should be exhibiting under ideal conditions).

The directional logic module 280 receives the current difference signal 242 and the simulated velocity signal 254 to selectively provide a signal 282 to indicate that the motor 220 is driving a load (e.g., valve) in an "up" direction (e.g., opening) or to selectively provide a signal 284 to indicate that the motor 220 is driving the load in a "down" direction (e.g., closing).

In general, the actuator monitor system 200 runs a real time simulation of the controller plus the plant, with the same position demand as the real system. If the simulation has no load (e.g., no inertial force), its actuator current signal is substantially representative of actuator acceleration current (e.g., represented by an acceleration value), which can be subtracted from measured current to yield load current. In some implementations, this technique can work well except when moving against a return spring while supply voltage and back EMF are limited. In some examples, this situation may only occur on large steps in the opening direction. In some implementations, directional learning can be suspended when this condition is identified by the actuator monitoring system 200.

Figure 3:
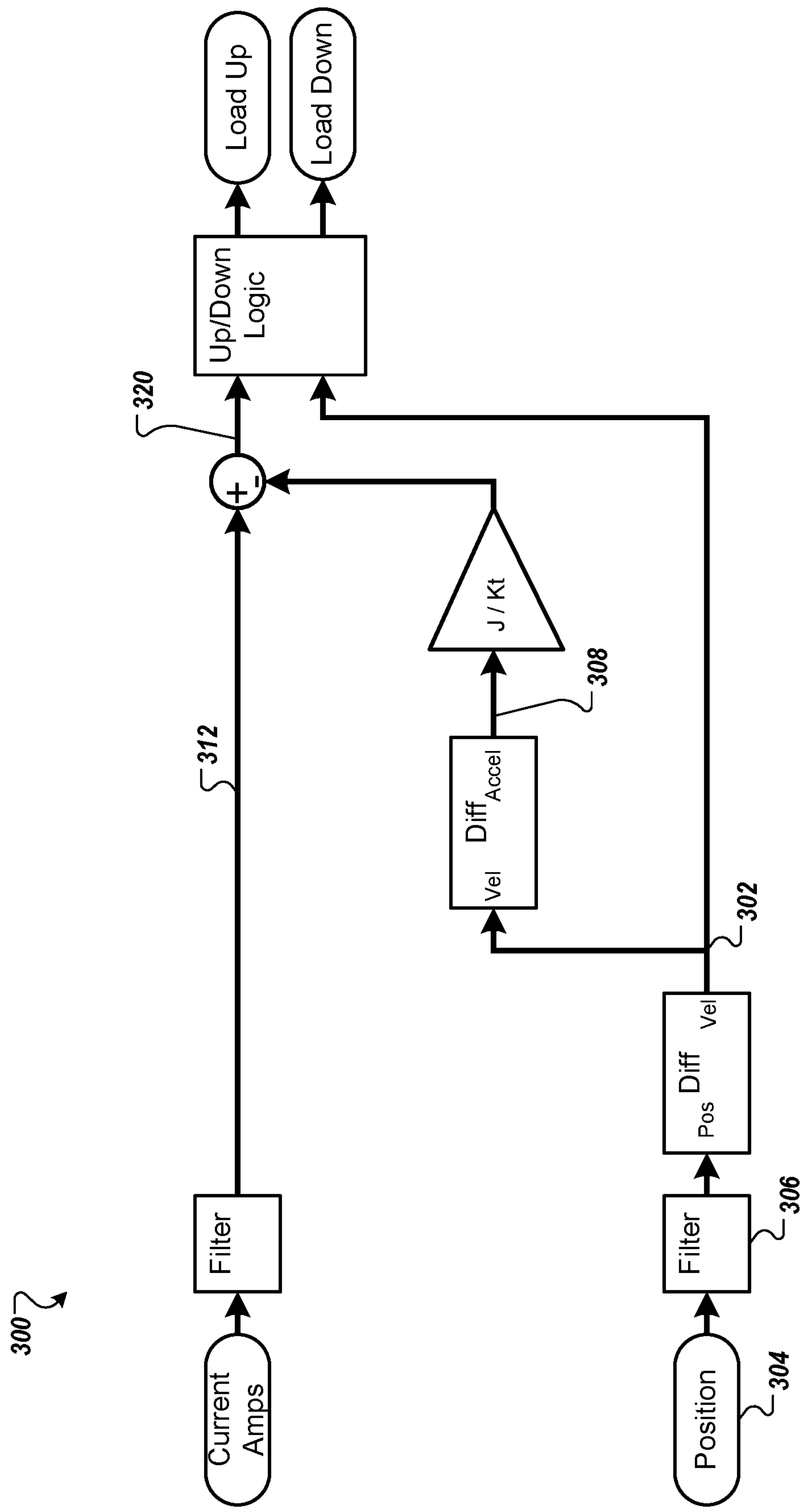
FIG. 3 is a block diagram of another example actuator monitoring system.

FIG. 3 is a block diagram of another example actuator monitoring system 300. In some embodiments, the actuator monitoring system 300 can be the example actuator monitoring system 140 of FIG. 1.

The example actuator monitoring system 300 implements an example derivative process in which an actuator acceleration valve can be obtained by differentiation of a velocity signal 302, which is a derivative of a position signal 304. Derivatives are inherently noisy, so a filter 306 is implemented to provide filtering of the position signal 304. Inertia and the motor torque constant are known by the controller (e.g., the example controller 120), so an acceleration current signal 308 can be calculated. A signal 310 representative of an amount of electrical current needed to overcome the load is calculated from a total measured current 312 minus the acceleration current 308. Phase of calculated acceleration current and measured current can be accurate, provided that measured current is filtered the same as the actuator acceleration signal.

A directional load detection module 320 determines a direction of load actuation based on the current signal 310 and the velocity signal 302. Directional load detection is discussed further in the description of FIG. 4.

In some implementations, an example actuator monitoring system can implement a process of stop identification during high actuator acceleration. For example, when an acceleration value indicates that acceleration is low, measured current and load current are similar. In some implementations, load identification can be paused when acceleration is high so accurate load identification can be done. In some examples, the acceleration signal can be determined by taking a second derivative of either position demand or position feedback. In some examples, the current signal can be delayed or filtered to substantially match the time delay caused by filtering the actuator acceleration signal.

In some implementations, even nearly ideal load current signals can vary within the bounds of load+/− friction. In some implementations, the example systems 200 and/or 300 can be configured to identify the amount of load current required to balance load when moving in the opening direction and the amount of current required to balance load when moving in the closing direction.

Figure 4:
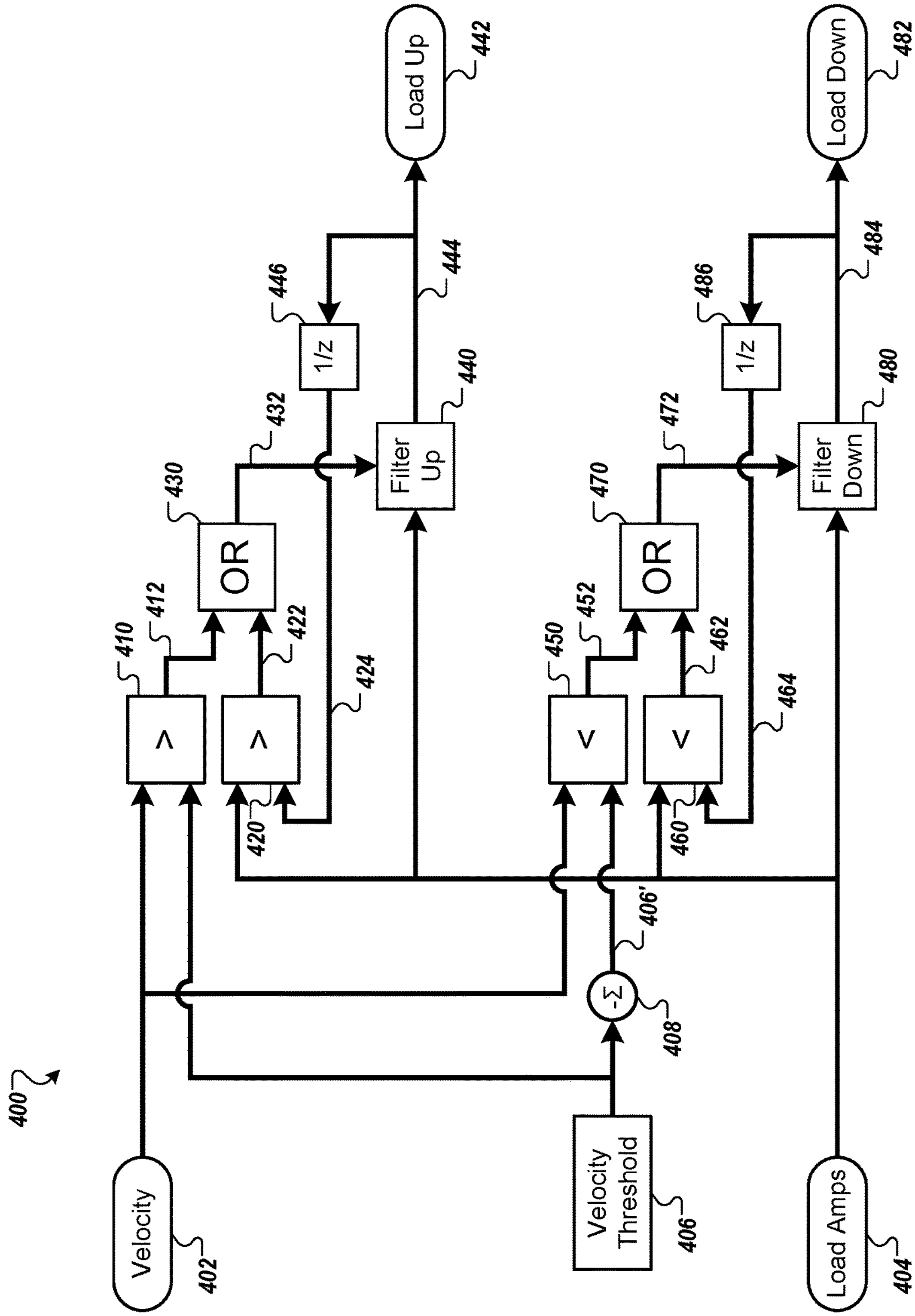
FIG. 4 is a block diagram of an example direction detection system.

FIG. 4 is a block diagram of an example directional load detection system 400. In some embodiments, the directional load detection system 400 can be included in one or more of the example actuator monitoring system 140 of FIG. 1, the actuator monitoring system 200 of FIG. 2, and/or the directional load detection module 320 of FIG. 3.

The directional load detection system 400 is configured to receive a velocity signal 402 that is representative of actuator velocity, a current signal 404 that is representative of actuator current under load, and a velocity threshold value 406 that is representative of a predetermined velocity (e.g., a deadband to differentiate between noise and/or vibration that is inherent around a substantially stopped position and signals that result from position-changing movement) in order to determine the direction of actuator movement.

At a comparator 410, the velocity signal 402 is compared to the velocity threshold value 406, and the comparator 410 provides a "true" logic signal 412 if the velocity signal 402 is greater than the velocity threshold value 406. At 420, the current signal 404 is compared to a delayed feedback current signal 424, and the comparator 420 provides a "true" logic signal 422 if the current signal 404 is greater than the delayed feedback current signal 424. At an OR block 430, if either of the logic signals 412 or 422 are "true", then a "true" logic signal 432 is provided to a filter gate 440 configured to pass or block passage of the current signal 404 as a current signal 444. Presence of the current signal 444 is indicative of the determined direction of actuator movement in a first direction (e.g., up, open) and is provided as a first directional output 442. The current signal 444 is also processed by unit delay block 446 to become the feedback current signal 424.

At a negation block 408, the velocity threshold value 406 is multiplied by negative 1 (e.g., −1) to provide a negative velocity threshold value 406'. At a comparator 450, the velocity 402 is compared to the negative velocity threshold value 406', and the comparator 450 provides a "true" logic signal 412 if the velocity signal 402 is less than the velocity threshold value 406. At 460, the current signal 404 is compared to a delayed feedback current signal 464, and provides a "true" logic signal 462 if the current signal 404 is less than the feedback current signal 464. At an OR block 470, if either of the logic signals 452 or 462 are "true", then a "true" logic signal 472 is provided to a filter gate 480 configured to pass or block passage of the current signal 404 as a current signal 484. Presence of the current signal 484 is indicative of determined direction of actuator movement in a second direction, opposite the first direction (e.g., down, closed) and is provided as a second directional output 482. The current signal 484 is also processed by a unit delay block 486 to become the delayed feedback current signal 464.

In general, if the velocity signal 402 (e.g., filtered similarly or identically to actuator acceleration for proper phase) is clearly positive (e.g., beyond the velocity threshold value 406), then the first filter gate 440 (e.g., a positive direction load current filter) is enabled. The first filter gate 440 is also enabled when current (e.g., the current signal 404) is higher than the positive direction filter value (e.g., the delayed feedback current signal 424), but movement is too slow to determine direction (e.g., due to position sensor noise). When neither of those is true, the filter remains in a "hold last value" condition. In some implementations, the velocity signal 402 can be considered clearly positive when its value is greater than the signal's noise level.

Similarly, the second filter gate 480 (e.g., a negative direction load current filter) is enabled when velocity is clearly negative or current is less than the negative direction filter value. The current signals 444 and 484 output by the filter gates 440 and 480 and their trends are compared to the current limits to determine a valve health value representative of valve health. In some implementations, current may be compared to zero in a fail-safe direction because closing load current less than zero can imply that friction is too high for a return spring of the actuator or load to function.

In some implementations, different load up/load down filters can be configured for different position ranges, or the filter states can be based on vectors of stored values, and the position of the actuator can be used to determine which vector element is updated. For example, this can be a way to deal with loads (e.g., including spring scale) that can vary substantially with position.

Figure 5:
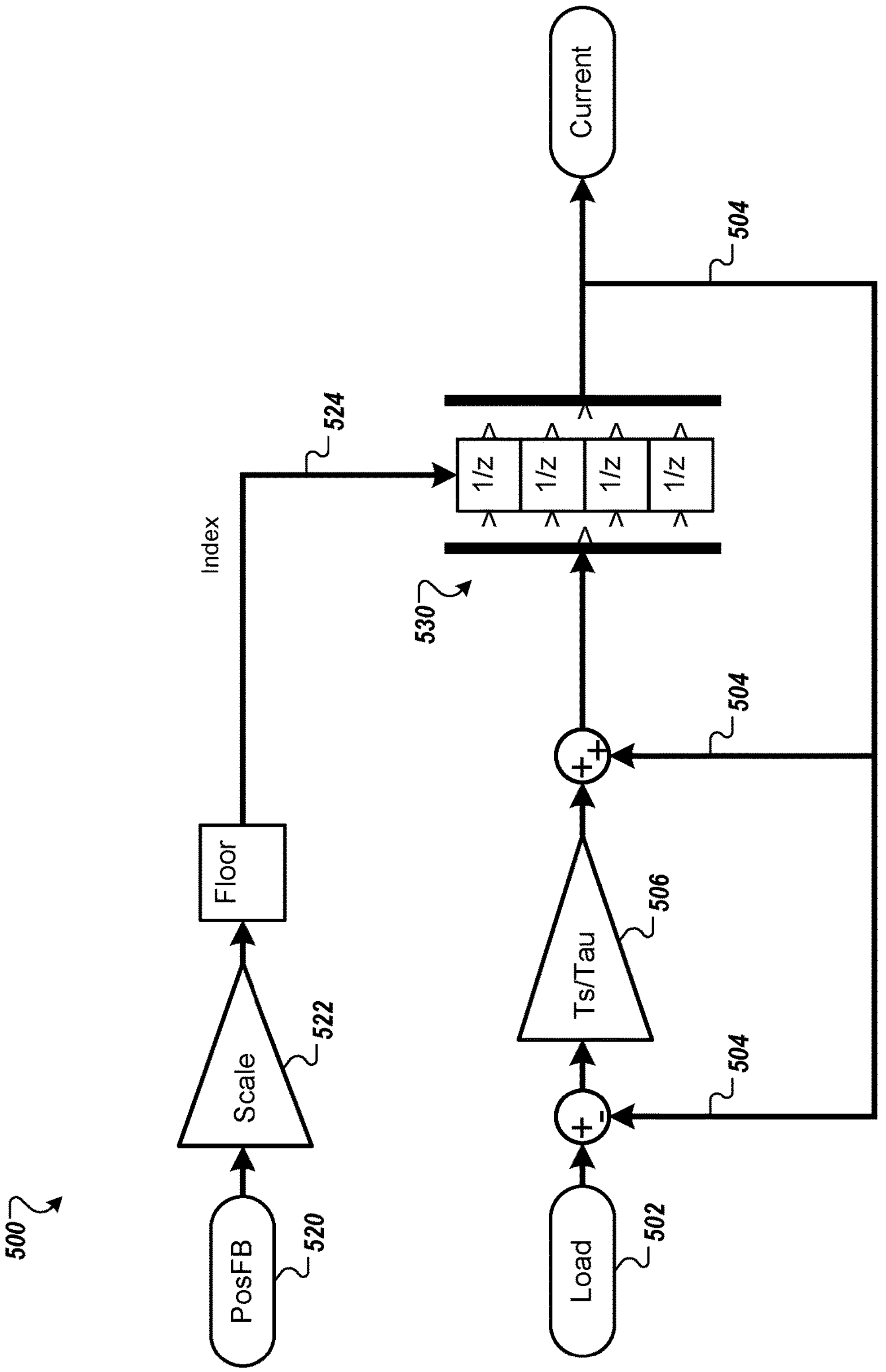
FIG. 5 is a block diagram example of a filter configured to create a vector of load versus position.

FIG. 5 is a block diagram example of a filter 500 configured to create a vector of load versus position. In some embodiments, the filter 500 can be included in one or more of the example actuator monitoring system 140 of FIG. 1, the example actuator monitoring system 200 of FIG. 2, the example actuator monitoring system 300 of FIG. 3, and/or the example direction detection system 400 of FIG. 4.

A load current signal 502, minus a delayed filter output signal 504, is multiplied by the sample time (Ts) and divided by the time constant (tau) at an amplifier 506, then added to the delayed filter output 504. In some implementations, this portion of the filter 500 can be a standard first order digital filter. In the illustrated example, a position signal 520 is scaled by an amplifier 522, and then turned into an integer to create an index 524 into a vector of delay elements 530. A selected one of the delay elements 530 acts as a normal delay (e.g., outputs a previous time step's input), while the non-selected elements hold their previous value. As the actuator moves over its stroke range, the delay vector 504 becomes a vector of load vs. position.

Figure 6:
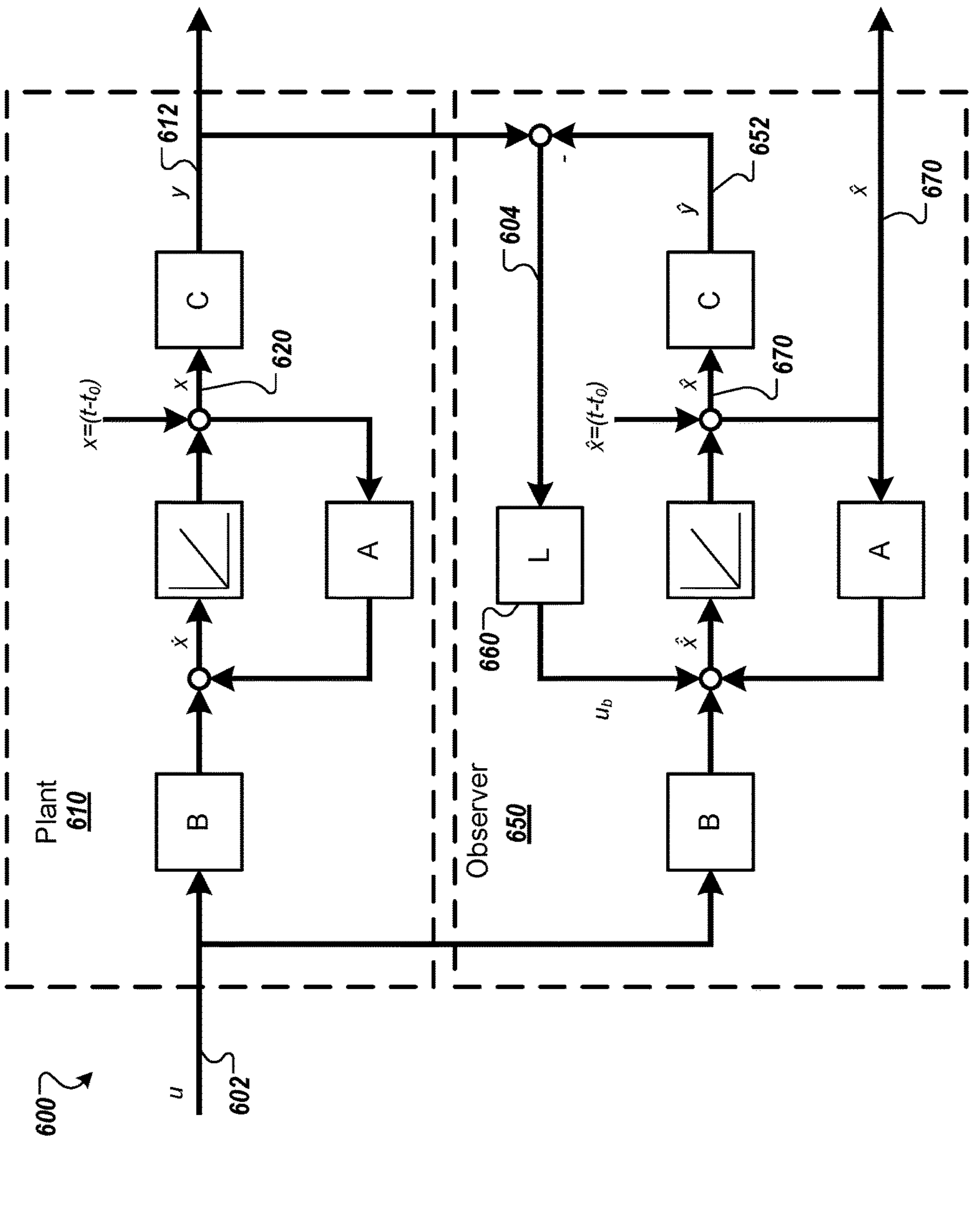
FIG. 6 is a block diagram of an example state observer system.

FIG. 6 is a block diagram of an example state observer system 600. In some embodiments, the state observer system 600 can be included in one or more of the example actuator monitoring system 140 of FIG. 1, the actuator monitoring system 200 of FIG. 2, the actuator monitoring system 300 of FIG. 3, and/or the direction detection system 400 of FIG. 4.

In general, state observers (e.g., state estimators, observers) include a model of a system, but they also have feedbacks from a real system to drive responses to match the real system. In some implementations, they can be used to estimate unmeasured states (e.g., states are the system's integrators, such as velocity and/or position). In some implementations, state observers can be useful even for measured states in order to get feedback with less noise and less phase loss than can be obtained from a physical sensor's signal.

In control theory, a state observer or state estimator is a system that provides an estimate of the internal state of a given real system, from measurements of the input and output of the real system. It is typically computer-implemented, and provides the basis of many practical applications.

The example state observer system 600 is an example of a Luenberger Observer. The state observer system 600 includes a plant 610 (e.g., an observable, "real" system) having an input 602 ($u$) and an output 612 ($y$), and an observer 650 (e.g., a model of the plant 610) having the input 602 and an output 652 (y_hat).

In the example state observer system 600, a difference 604 between the output 612 and the output 652 (e.g., the difference between y and y_hat) is determined and used to correct the model, through a matrix 660 of gains L, to produce an output 670 (x_hat), corresponding to an output 620 ($x$) that was not measured in the plant 610. The rest of the observer 650 is a model of the plant 610.

Figure 7:
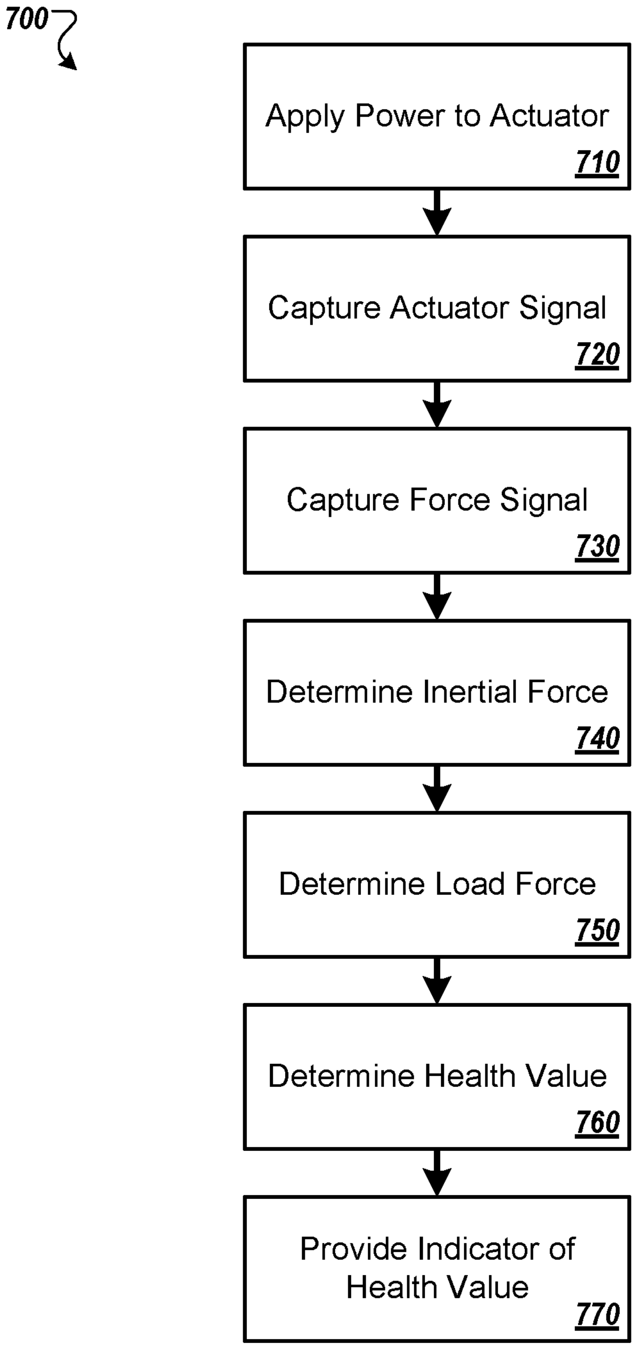
FIG. 7 is flow chart that shows an example of a process for monitoring an actuator.

FIG. 7 is flow chart that shows an example of a process 700 for monitoring an actuator. In some implementations, the process 700 can be performed by all or part of the example industrial turbine control system 100 of FIG. 1.

At 710 power is applied to an actuator operating in a nominal operational state. For example, power can be applied to the example controllable actuator 114.

At 720 a first signal, representative of actuator movement or actuator position, is captured. For example, the sensor 142 can sense the movement or position of the actuator 114, and provide the signal 143 as a representation of the sensed condition.

At 730, a second signal representative of total actuator force is captured. For example, the force provided by the actuator 114 and/or the controllable load 115 are sensed by the sensor 144, and the sensor 144 can provide the signal 145 as a representation of the sensed condition.

At 740, an inertial force value, representative of force used to overcome at least one of inertia of the actuator and inertia of a load on the actuator, is determined based on the first signal. For example, when the feedback signal 143 represents a change from zero movement to at least a predetermined threshold amount of movement, the actuator monitoring system 140 can determine that the amount of force applied at that moment is sufficient to overcome inertia of the actuator 114 and/or the load 115.

At 750, a load force value representative of actuator force used to overcome force of the load and friction of the load is determined based on the inertial force value and the captured second signal. For example, the actuator monitoring system 140 can subtract the determined inertial force value from the total force value, with the result being representative of the force used to move the actuator 114.

At 760, a health value of the actuator is determined based on the load force value. For example, if the determined load force value is at or below a predetermined threshold value (e.g., suggestive of smooth or easy movement of the actuator), then the actuator can be determined to be in a favorable mechanical condition, and the health value can be set to represent the favorable condition. If the determined load force value exceeds the predetermined threshold value (e.g., suggestive of difficult or impaired movement of the actuator), then the actuator can be determined to be in an unfavorable mechanical condition, and the health value can be set to represent the unfavorable condition.

At 770, an indicator based on the health value as an indication of health of at least one of the actuator and the load is provided. For example, the controller 120 health output signal 190.

In some implementations, the process 700 can also include determining, based on the captured first signal, low acceleration of the actuator. For example, the actuator monitoring system 140 can determine acceleration of the actuator 114 based on the feedback signal 143, and compare the determined acceleration against a predetermined acceleration threshold to determine that the actuator 114 is accelerating nominally or if it is accelerating slowly (e.g., an indication of a possible mechanical problem).

In some implementations, determining the load force value can include determining, based on the captured second signal, a total force value, determining, based on the inertial force value, an inertial force of at least one of the actuator and of the load, determining a difference between the total force value and the inertial force value, and providing the determined difference as the load force value. For example, the actuator monitoring system 140 can subtract the determined inertial force value from the total force value, with the result being representative of the force used to move the actuator 114. In some implementations, the inertial force value can be a predetermined inertial force value of at least one of the actuator and the load. For example, the actuator monitoring system 140 can be configured or preprogrammed with values that are representative of inertial forces that are known (e.g., experimentally, theoretically) for the actuator 114 and/or the load 115.

In some implementations, the inertial force value can be based on (1) a predetermined mass of at least one of the actuator and the load, and (2) an acceleration value of the actuator based on the captured first signal. For example, when mass and acceleration are known, force can be determined mathematically by the actuator monitoring system 140.

In some implementations, the acceleration value can be determined based on a differential based on the captured first signal. For example, the feedback signal 143 or 145 can be captured to determine a trend of position values, to which position function calculus operations can be applied (e.g., derivatives can be determined) to determine corresponding acceleration values.

In some implementations, the acceleration value can be determined based on a measurement of actuator acceleration. For example, the sensor 142 or 144 can include an accelerometer configured to provide a direct measurement of actuator movement acceleration.

In some implementations, the acceleration value can be determined based on a model or state observer of the actuator. For example, the example actuator simulation 250 of FIG. 2 or the example observer 650 of FIG. 6 can be observed to determine an estimate of acceleration of the actuator 114 in configurations in which direct measurement of the actuator 114 is impractical or impossible.

In some implementations, the power applied to the actuator can be electrical power, and the second signal can be representative of at least one of applied voltage or applied current, or power applied to the actuator can be fluid power, and the second signal can be representative of applied fluid pressure. For example, the actuator 114 can be an electromechanical device (e.g., an electric motor) driven by electrical power that can be measured or otherwise determined. In another example, the actuator 114 can be a fluid powered device (e.g., a hydraulic or pneumatic actuator) driven by pressurized fluid having a pressure and/or flow that can be measured or otherwise determined.

In some implementations, the health value can be determined by filtering the captured second signal. For example, the load force signal can be filtered to determine an indication of the health of the actuator 114. In some implementations, the health value can be determined based on a comparison of a predetermined threshold value to at least one of the filtered second signal and a determined long-term force trend. For example, the example current signals 444 and 484 output by the example filter gates 440 and 480 and their trends can be compared to current limits to determine a valve health value representative of valve health.

In some implementations, the process 700 can include determining, based on the captured first signal, a direction of movement of the actuator, wherein the health value is further based on the determined direction. For example, spring return forces, forces on the load 115 (e.g., the forces of fluids flowing through a valve controlled by the actuator 114, gravity, spring return force) can aid or resist the action of the actuator 114 depending on the direction of movement, thereby possibly requiring different amounts of force in different directions. The example direction detection system 400 of FIG. 4 can be used to determine the direction of movement. In some implementations, the actuator monitoring system 140 may only determine the health of the actuator 114 based on movement in a predetermined direction and not in the other (e.g., health may only be based on opening movements, but not closing movements), and the health output signal 190 can be representative of such unidirectionally-based actuator health.

In some implementations, the process 700 can include providing, to a user, an indication representative of the health value. For example, the health output signal 190 can be provided directly to a user (e.g., as an alarm, display, indicator) or can be provided indirectly to a user (e.g., a signal that is readable by another device to provide an indication, an email or text notification, update a maintenance database).

Figure 8:
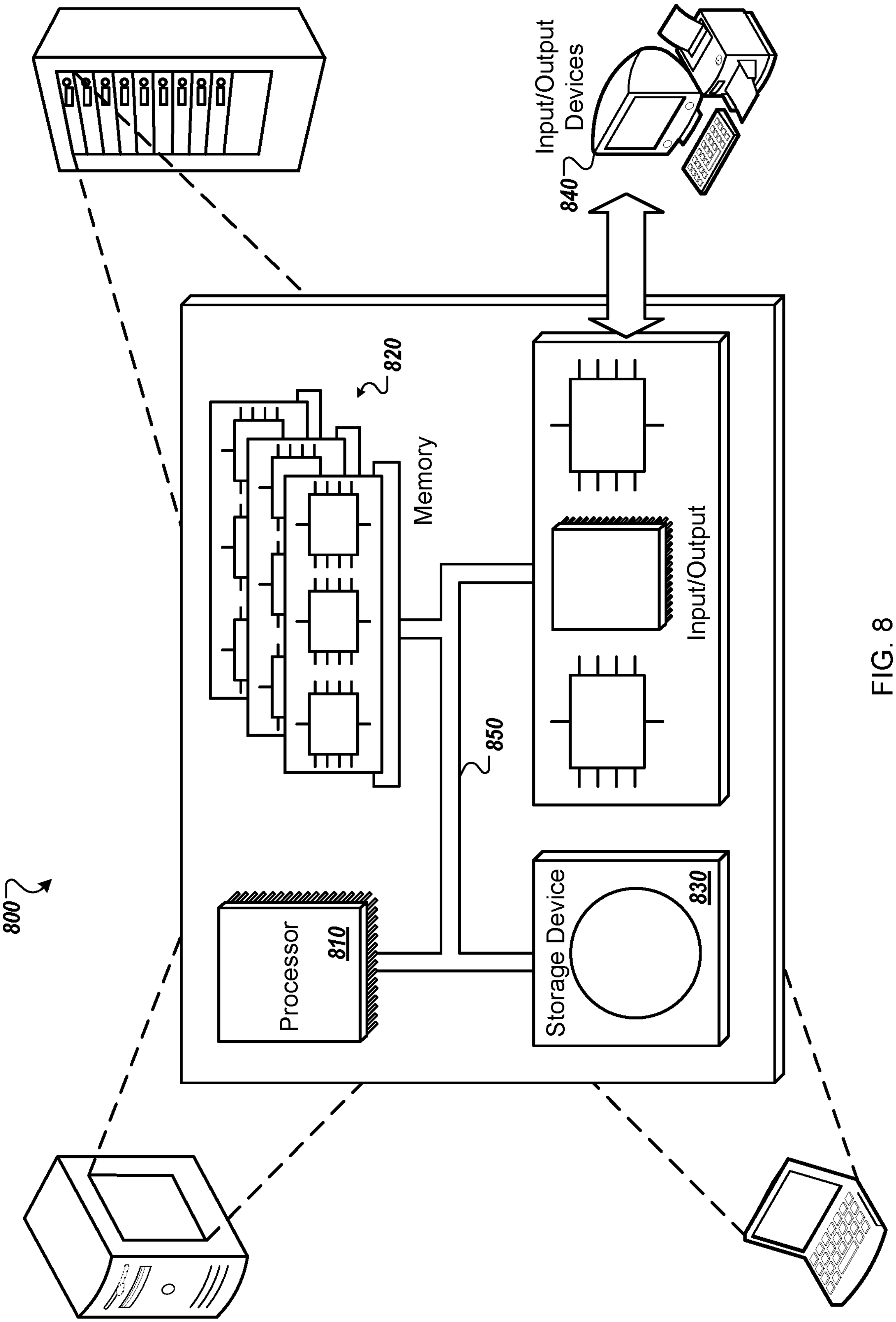
FIG. 8 is a schematic diagram of an example of a generic computer system

FIG. 8 is a schematic diagram of an example of a generic computer system 800. The system 800 can be used for the operations described in association with the process 700 according to one implementation. For example, the system 800 may be included in either or all of the example actuator monitoring system 140 of FIG. 1, the actuator monitoring system 200 of FIG. 2, the actuator monitoring system 300 of FIG. 3, the direction detection system 400 of FIG. 4, and/or the example state observer system 600 of FIG. 6.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
- applying power to an actuator while the actuator operates in a nominal operational state to control a turbine;
- capturing a first sensor signal representative of actuator movement or actuator position;
- capturing a second sensor signal representative of total actuator force;
- determining, based on the first sensor signal, an inertial force value representative of force used to overcome at least one of inertia of the actuator and inertia of a load on the actuator;
- determining, based on the inertial force value and the captured second sensor signal, and without taking the turbine offline, a load force value representative of actuator force used to overcome force of the load and friction of the load;
- determining a health value of the actuator based on the load force value;
- adjusting the power to the actuator that controls the turbine based on the determined health value and the load; and providing an indicator based on the health value as an indication of health of at least one of the actuator and the load;
- wherein determining the load force value comprises:
- determining, based on the captured second sensor signal, a total force value;
- determining, based on the inertial force value, an inertial force of at least one of the actuator and of the load;
- determining a difference between the total force value and the inertial force value; and
- providing the determined difference as the load force value.

2. The method of claim 1, further comprising determining, based on the captured first sensor signal, low acceleration of the actuator.

3. The method of claim 1, wherein the inertial force value is a predetermined inertial force value of at least one of the actuator and the load.

4. The method of claim 1, wherein the inertial force value is based on (1) a predetermined mass of at least one of the actuator and the load, and (2) an acceleration value of the actuator based on the captured first sensor signal.

5. The method of claim 4, wherein the acceleration value is determined based on a differential based on the captured first sensor signal.

6. The method of claim 4, wherein the acceleration value is determined based on a measurement of actuator acceleration.

7. The method of claim 4, wherein the acceleration value is determined based on a model or state observer of the actuator.

8. The method of claim 1, wherein:
- power applied to the actuator is electrical power, and the captured second sensor signal is representative of at least one of applied voltage or applied current; or
- power applied to the actuator is fluid power, and the captured second sensor signal is representative of applied fluid pressure.

9. The method of claim 1, wherein the health value is determined by filtering the captured second sensor signal.

10. The method of claim 9, wherein the health value is determined based on a comparison of a predetermined threshold value to at least one of the filtered second sensor signal and a determined long-term force trend.

11. The method of claim 1, further comprising determining, based on the captured first sensor signal, a direction of movement of the actuator, wherein the health value is further based on the determined direction.

12. The method of claim 1, further comprising providing, to a user, an indication representative of the health value.

13. The method of claim 1, further comprising learning one or both of a loading level and a friction level over a range of operating conditions.

14. The method of claim 1, wherein providing the indicator comprises actuating an indicator light.

15. The method of claim 1, wherein providing the indicator comprises actuating an audible alarm.

16. A system for determining health of an actuator under a load, the system comprising:
- a first sensor configured to provide a first sensor signal representative of position or movement of an actuator;
- a second sensor configured to provide a second sensor signal representative of total force provided by the actuator;
- a processing system configured to:
  - apply power to an actuator while the actuator operates in a nominal operational state to control a turbine;
  - receive the first sensor signal;
  - receive the second sensor signal;
  - determine, based on the received first sensor signal, an inertial force value representative of force used to overcome at least one of inertia of the actuator and inertia of a load on the actuator;
  - determine, based on the inertial force value and the received second sensor signal, and without taking the turbine offline, a load force value representative of actuator force used to overcome force of the load and friction of the load;

determine a health value of the actuator based on the load force value; and adjust the power to the actuator that controls the turbine based on the determined health value and the load; and an indicator configured to provide an indication of health of at least one of the actuator and the load based on the health value;

wherein determining the load force value comprises:

determining, based on the received second sensor signal, a total force value;

determining, based on the inertial force value, an inertial force of at least one of the actuator and of the load;

determining a difference between the total force value and the inertial force value; and providing the determined difference as the load force value.

17. The system of claim 16, wherein the inertial force value is based on (1) a predetermined mass of at least one of the actuator and the load, and (2) an acceleration value of the actuator based on the received first sensor signal.

18. The system of claim 17, wherein the acceleration value is determined based on a differential based on the received first sensor signal.

19. The system of claim 17, wherein the acceleration value is determined based on a measurement of actuator acceleration.

20. The system of claim 17, wherein the acceleration value is determined based on a model or state observer of the actuator.

21. A turbine control system comprising:

a turbine;

an actuator configured to control a flow to the turbine based on a control signal;

a first sensor configured to provide a first sensor signal representative of position or movement of the actuator;

a second sensor configured to provide a second sensor signal representative of total force provided by the actuator;

a turbine controller configured to:

apply power to the actuator while the actuator operates in a nominal operational state to control the turbine;

receive the first sensor signal;

receive the second sensor signal;

determine, based on the received first sensor signal, an inertial force value representative of force used to overcome at least one of inertia of the actuator and inertia of a load on the actuator;

determine, based on the inertial force value and the received second sensor signal, and without taking the turbine offline, a load force value representative of actuator force used to overcome force of the load and friction of the load;

determine a health value of the actuator based on the load force value; and adjust the power to the actuator that controls the turbine based on the determined health value and the load;

an indicator configured to provide an indication of health of at least one of the actuator and the load based on the health value;

wherein determining the load force value comprises:

determining, based on the received second sensor signal, a total force value;

determining, based on the inertial force value, an inertial force of at least one of the actuator and of the load;

determining a difference between the total force value and the inertial force value; and providing the determined difference as the load force value.

22. The turbine control system of claim 21, wherein the inertial force value is based on (1) a predetermined mass of at least one of the actuator and the load, and (2) an acceleration value of the actuator based on the received first sensor signal.

23. The turbine control system of claim 22, wherein the acceleration value is determined based on a differential based on the received first sensor signal.

24. The turbine control system of claim 22, wherein the acceleration value is determined based on a measurement of actuator acceleration.

25. The turbine control system of claim 22, wherein the acceleration value is determined based on a model or state observer of the actuator.

* * * * *